United States Patent [19]

Kojima et al.

[11] 4,375,879
[45] Mar. 8, 1983

[54] CABLE CLIP

[75] Inventors: Masaharu Kojima; Tsutomu Kadomiya, both of Toyota, Japan

[73] Assignee: Nifco Inc., Yokohama, Japan

[21] Appl. No.: 299,431

[22] Filed: Sep. 4, 1981

[30] Foreign Application Priority Data

Sep. 19, 1980 [JP] Japan .......................... 55-132175[U]

[51] Int. Cl.³ .............................................. F16L 3/08
[52] U.S. Cl. .................................. 248/73; 248/74 R
[58] Field of Search ................ 248/73, 74 R, 74 A, 248/68 R, 239, 216.1, 220.4, 222.2, 222.3, 226.5, 231; 403/353

[56] References Cited

U.S. PATENT DOCUMENTS

| 3,444,596 | 5/1969 | Soltysik | 248/73 |
| 4,061,299 | 12/1977 | Kurosaki | 248/73 |
| 4,112,815 | 9/1978 | Tanaka | 248/73 X |
| 4,131,258 | 12/1978 | Okuda et al. | 248/73 |
| 4,192,478 | 3/1980 | Coules | 248/222.3 |

FOREIGN PATENT DOCUMENTS

| 1000677 | 11/1976 | Canada | 248/73 |
| 2455866 | 6/1975 | Fed. Rep. of Germany | 248/73 |
| 2921891 | 12/1980 | Fed. Rep. of Germany | 248/226.5 |

*Primary Examiner*—William H. Schultz
*Assistant Examiner*—Ramón O. Ramirez
*Attorney, Agent, or Firm*—Trexler, Bushnell & Wolters, Ltd.

[57] ABSTRACT

A cable clip of a construction such that the attachment thereof to a given panel is accomplished by inserting the clip into the larger of two sized holes, moving the clip to the smaller of the two holes via an intermediate path connecting the two sized holes, and thereafter rotating the clip within the smaller hole is disclosed. The clip is improved so as to be prevented from being unexpectedly rotated backward within the smaller hole and slipped off the fitting hole by means of one or more rotation-regulating pieces which keep the clip in the state of fast attachment to the panel.

1 Claim, 6 Drawing Figures

CABLE CLIP

BACKGROUND OF THE INVENTION

This invention relates to a cable clip made of a synthetic resin, which is attachable to a panel by a simple act and, once attached to the panel, can be retained fast in the attached state even when vibration and other impact are accidentally exerted thereon.

Generally, cables for use in electric appliances and particularly in automobiles are laid along and fastened to panels or chassis by means of a multiplicity of cable clips. In the cable clips of this kind, it must be considered to prevent cable clips attached to panels from being accidentally separated from the panels because of an external force such as vibration and impact. One of the conventional cable clips satisfying this requirement is constructed so as to effect the attachment of the engaging portion thereof to two sized fitting holes bored in advance in a given panel and interconnected with each other by utilizing an upper flange, a lower flange and a connecting shank having an oval cross section and serving to join the two flanges to each other. To be more specific, this attachment is accomplished by first passing the lower flange of the engaging portion through the larger of the two interconnected holes bored in the panel thereby placing the connecting shank within the hole, then adjusting the engaging portion so as to permit the direction of the major diameter of the connecting shank to be aligned with the line connecting the centers of the large and small holes, shifting the connecting shank to the small holes through a narrow intermediate path joining the two holes, thereby securing the clip in position under such a condition that the upper and lower flanges of the engaging portion nip the panel and the engaging portion is prevented from being drawn out in the axial direction of the small hole, and subsequently rotating the engaging portion by 90° thereby causing the direction of the major diameter of the connecting shank to intersect perpendicularly the line connecting the centers of the large and small holes, consequently making it impossible for the connecting shank to move through the connecting path, and locking the engaging portion to the smaller of the two holes.

Once the conventional cable clip is attached to the panel as described above, therefore, it avoids shifting its position to the larger hole and remains intact in its present state unless the engaging portion is rotated. As a result, the nipping portion of the cable clip is allowed to continue its function of nipping a cable between itself and the panel. However, when the engaging portion is caused to be rotated by some cause thereby aligning the direction of the major diameter of the connecting shank with the line connecting the centers of the holes, there arises the problem that the engaging portion is shifted to the hole of the larger diameter and automatically slipped off the fitting hole. Especially, when cable clips of this kind are used as means for fastening cables distributed within automobile bodies, it occurs not infrequently that owing to the vibration generaged by the automobile bodies in traveling, the cable clips are caused to be rotated and slip off the fitting holes or the cables nipped by the clips are pulled so much as to rotate the engaging portion with the nipping portion as the lever and eventually slip them off the fitting holes. Improvement for solving this problem, therefore, has been in great demand.

SUMMARY OF THE INVENTION

An object of this invention is to provide a cable clip constructed so that once the engaging portion thereof is fastened to a fitting hole bored in a given panel, it is prevented from being rotated and slipped off the fitting hole unexpectedly.

To accomplish the object described above according to this invention, there is provided a cable clip which comprises in combination a connecting shank adapted for engagement with a fitting hole bored in advance in a given panel, a nipping portion integrally extended from the connecting shank and adapted to catch hold of one or more given cables, a upper and a lower flanges formed at the opposite ends of the connecting shank, and rotation-regulating pieces projecting downwardly from the edge of the upper flange.

There is bored in advance in a given fixing panel a fitting hole consisting of two sized holes, one larger and the other smaller than the lower flange of the cable clip, and a slender slit connecting the two holes to each other and, therefore, resembling roughly the figure of the numeral 8. The attachment of the cable clip of this invention to the panel is accomplished by passing the lower flange of the cable clip through the larger of the two sized holes, sliding the connecting shank through the slit thereby shifting the cable clip to the smaller of the two holes and causing the panel to be nipped between the upper and lower flanges. The connecting shank is given an oval cross section having the minor diameter smaller than the width of the slit connecting the two sized holes. Consequently, when the clip is shifted to the smaller hole as described above and then rotated roughly by a right angle within the smaller hole, it is incapable of being rotated due to the rotation-regulating pieces and therefore, becomes locked in that position. The possibility that an unexpected external force exerted on the clip will rotate the clip and move it toward the larger hole is totally eliminated by the rotation-regulating pieces adapted to be set in the slit connecting the fitting holes.

The other objects and characteristics of the present invention will become apparent from the further disclosure of the invention to be made hereinafter with reference to the accompanying drawings.

DESCRIPTION OF THE PREFERRED EMBODIMENTS

Figure 1:
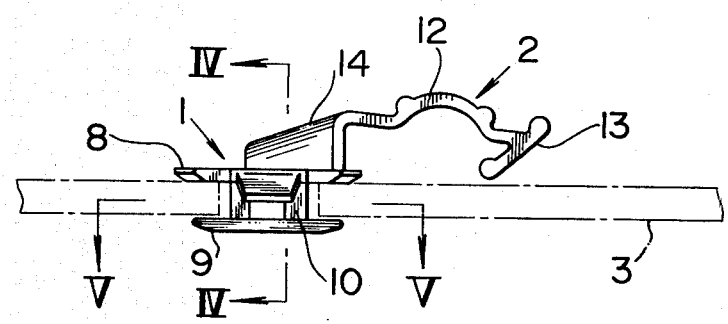
FIGS. 1 to 3 are respectively a front view, a plan view and a side view of one embodiment of the cable clip of the present invention.
Figure 2:
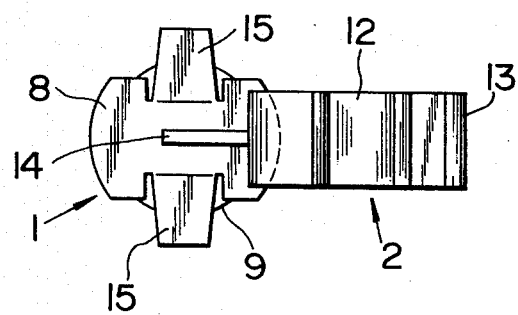
Figure 3:
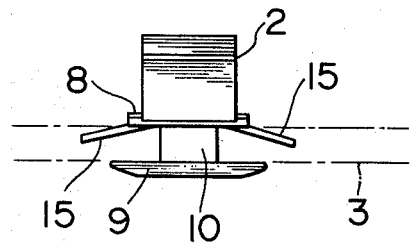
Figure 4:
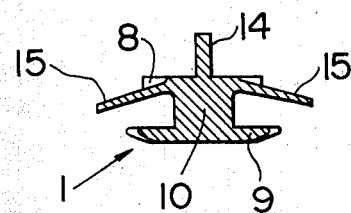
FIG. 4 is a sectional view taken along the line IV—IV of FIG. 1.

This invention relates to a cable clip excelling in the fastness with which it is attached to a given fixing panel. One embodiment of this invention is illustrated in the accompanying drawings.

An engaging portion 1 is adapted to be fastened to a fitting hole 7 formed in a fixing panel 3 roughly in the shape of the numeral 8, with two mutually adjacent holes, one 4 with a larger diameter and the other 5 with a smaller diameter, connected with each other by a connecting path 6 having a width smaller than the diameter of the smaller hole 5. The engaging portion 1 is formed of an upper flange 8, a lower flange 9 opposed to the lower side of the upper flange 8, and a connecting shank 10 serving to connect these two flanges to each other.

Figure 5:
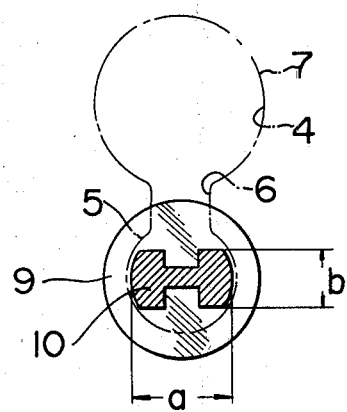
FIG. 5 is a sectional view taken along the line V—V of FIG. 1.
Figure 6:
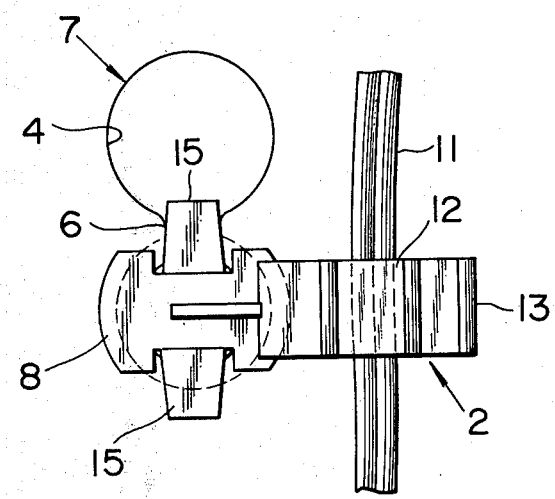
FIG. 6 is a plan view illustrating the condition in which the cable clip is put to use.

The upper flange 8 has a diameter greater than that of the larger hole 4 in the fitting hole 7 and the lower flange 9 has a diameter greater than that of the smaller hole 5. The connecting shank 10 connecting these flanges has a length roughly equal to the thickness of the panel 3 so that the space intervening between the upper and lower flanges 8, 9 nearly equals the thickness of the panel. This connecting shank 10 is formed in an oval cross section. As illustrated in FIG. 5, the major diameter a of the oval connecting shank 10 is smaller than the diameter of the smaller hole 5 of the fitting hole and greater than the width of the connecting path 6 and the minor diameter b thereof is smaller than the width of the connecting path 6.

A nipping portion 2 of the cable clip is extended in the direction of the major diameter of the connecting shank 10 from the upper surface of the upper flange 8 of the engaging portion constructed as described above. The nipping portion 2 is formed so that the leading end thereof falls flush with the upper surface of the upper flange 8 and the part halfway along the length thereof is curved upwardly to form a retaining recess 12 for a cable 11. In the present embodiment, the nipping portion 2 is provided at the leading end thereof with an inwardly inclined plate 13 to facilitate insertion of a given cable in the retaining recess 12. Between the basal end of the nipping portion 2 and the upper flange 8, there is provided a reinforcing rib 14 to increase the rigidity of the nipping portion and the force with which the nipping portion retains the cable in position.

In the cable clip of the present invention which is constructed as described above, the reference numeral 15 denotes each of rotation-regulating pieces formed integrally of the engaging portion 1 and extended outwardly from the upper flange 8 of the engaging portion.

As shown in the drawings, the rotation-regulating pieces 15 are formed so as to protrude in the direction of the minor diameter of the connecting shank 10. Besides, they are slanted so that their leading ends fall below the lower side of the upper flange 8. These rotation-regulating pieces are formed in a small wall thickness so as to acquire resilient force. The leading ends of these rotation-regulating pieces have a width smaller than the width of the connecting path 6 in the fitting hole 7 so that they may be thrust into the connecting path after the engaging portion 1 has been attached to the fitting hole as will be more fully described afterward.

The cable clip of the present invention provided with the rotation-regulating pieces 15, namely the engaging portion 1 incorporating the rotation-regulating pieces 15 and the nipping portion 2 are integrally molded of a synthetic resin and are produced as a one-piece article. This cable clip is used in the same way as any of the conventional cable clips of this type. Specifically, the use of the clip involves first inserting the lower flange 9 of the engaging portion 1 into the larger 4 of the fitting hole 7 until the upper flange 8 comes into contact with the surface of the panel 3, rotating the engaging portion 1 so as to align the direction of the major diameter of the connecting shank 10 to the longitudinal direction of the connecting path 6, namely to the line connecting the centers of the holes 4, 5, and moving the entire clip sideways along the surface of the panel thereby causing the connecting shank 10 to pass through the connecting path 6 and reach the smaller hole 5. In this state, the engaging portion 1 has the upper and lower flanges 8, 9 held in intimate contact with the opposite surfaces of the panel 3. The engaging piece 1, therefore, is incapable of being drawn out in the axial direction of the fitting hole. It is now in the state of temporary attachment to the panel.

Then, the engaging portion 1 is rotated by 90° so that the direction of the major diameter of the connecting shank 10 perpendicularly intersects the line connecting the centers of the holes 4, 5, consequently, making it impossible to move the connecting shank through the connecting path 6 and retaining the clip in the state of fast attachment to the panel. In this state, the nipping portion 2 is opposed to one surface (upper surface) of the panel 3 as illustrated in FIG. 1 and the retaining recess 12 embraces a space for admitting a cable 11 in conjunction with the panel 3.

The attachment of the engaging portion 1 to the fitting hole 7 is accomplished by means of the engaging portion 1 being retained within the smaller hole by the cooperation of the upper and lower flanges 8, 9 and the connecting shank 10. In the conventional cable clip, if the engaging portion 1 is accidentally rotated and the direction of the major diameter of the connecting shank allowed to coincide with that of the connecting path, then the engaging portion is allowed to terminate the state of fast attachment and move along the connecting path.

The cable clip of the present invention precludes this awkward situation by means of the rotation-regulating pieces 15. When the connecting shank 10 has been moved to the smaller hole 5 and then rotated to change the direction of the major diameter of the connecting shank relative to the direction of the connecting path, the rotation-regulating pieces 15 which have been so far held in contact with the surface of the panel 3 are allowed to plunge into the connecting path 6 through which the travel of the connecting shank has been permitted. Consequently, the connecting shank 10 is no longer allowed to continue its rotation or produce any reverse rotation within the smaller hole 5.

Once the attachment of the engaging portion 1 to the fitting hole 7 is obtained, therefore, the rotation-regulating pieces function to eliminate the possibility of the engaging portion 1 being readily rotated about itself, Unlike the conventional cable clips, therefore, the cable clip of this invention has absolutely no possibility of being accidentally released from the state of fast attachment by an external force such as vibration or tension exerted upon the cable held in position by the nipping portion, for example.

During the attachment of the fastening portion to the fitting hole, the rotation-regulating pieces 15 are automatically locked into the connecting path 6 because of their own resiliency, with the result that the connecting shank 10 is immobilized within the smaller hole with the direction of the major diameter thereof perpendicularly intersecting the line connecting the centers of the holes 4, 5. Consequently, the engaging portion is not merely prevented from being readily rotated about itself but also allowed to remain most stable at all times in its state of fast attachment. The rotation-regulating pieces are additionally effective in facilitating the operation of fast attachment itself. Of course, the clip of this invention permits the engaging portion to be rotated and consequently removed from the panel when the rotation-regulating pieces are released from the connecting path.

The embodiment so far described represents a case wherein two rotation-regulating pieces are extended in opposite directions from the edge of the upper flange 8. The provision of these two rotation-regulating pieces permits the engaging portion to be rotated in either direction for the purpose of the attachment to the fitting hole and proves advantageous in the sense that it permits selection of the direction in which the nipping portion 2 is thrust out. As is plain from the aforementioned function, provision of just one rotation-regulating piece suffices for its purpose. The number of rotation-regulating pieces is purely a matter of free choice which depends on the convenience of actual use of the clip. The rotation-regulating pieces are not always required to be in the shape of plates but may be formed in the shape of rods.

What is claimed is:

1. In a cable clip which is molded of a synthetic resin and is attachable to a fitting hole formed by forming in a panel first and second holes which are respectively larger and smaller than each other and connected with each other by means of a connecting path, which cable clip comprises an engaging portion adapted to be attached to the fitting hole in the panel; a nipping portion integrally connected with said engaging portion and used for nipping one or more given cables on said panel, said engaging portion consisting of an upper flange having a diameter greater than that of said larger hole of said fitting hole, a lower flange opposed to the lower side of said upper flange and having a diameter smaller than that of the larger hole of said fitting hole and larger than that of the smaller hole of said fitting hole and a connecting shank adapted to connect the upper and lower flanges at regular intervals roughly equal to the thickness of said panel and formed in an oval cross section having a major diameter and a minor diameter respectively larger and smaller than the width of the connecting path of said fitting hole, and said nipping portion being extended from said upper flange in the direction of said major diameter of said oval connecting shank; the improved cable clip comprising portions of said upper flange and portions of said lower flange both of which are in distal relation to said connecting shank cooperating to cause at least one resilient rotation-regulating piece extended from the edge portion of said upper flange of said engaging portion in the direction of the minor diameter of said connecting shank to be oriented downwardly and the leading end thereof inserted into said connecting path thereby positively preventing rotation of said clip within said smaller hole.

* * * * *